US007386796B1

(12) United States Patent
Simpson et al.

(10) Patent No.: US 7,386,796 B1
(45) Date of Patent: Jun. 10, 2008

(54) METHOD AND EQUIPMENT ADAPTED FOR MONITORING SYSTEM COMPONENTS OF A DATA PROCESSING SYSTEM

(75) Inventors: Richard Ormond Simpson, Austin, TX (US); David Alan Garrison, Austin, TX (US); Yiqin Zhao, Austin, TX (US)

(73) Assignee: Newisys Inc., Austin, TX (US)

( * ) Notice: Subject to any disclaimer, the term of this patent is extended or adjusted under 35 U.S.C. 154(b) by 767 days.

(21) Appl. No.: 10/404,809

(22) Filed: Apr. 1, 2003

Related U.S. Application Data

(60) Provisional application No. 60/402,686, filed on Aug. 12, 2002.

(51) Int. Cl.
*G06F 3/00* (2006.01)
(52) U.S. Cl. ...................................................... 715/736
(58) Field of Classification Search ................. 715/736
See application file for complete search history.

(56) References Cited

U.S. PATENT DOCUMENTS

| | | | | |
|---|---|---|---|---|
| 5,261,044 A | * | 11/1993 | Dev et al. .................... | 715/855 |
| 5,491,495 A | * | 2/1996 | Ward et al. .................. | 345/173 |
| 5,767,852 A | * | 6/1998 | Keller et al. ................. | 715/835 |
| 5,801,699 A | * | 9/1998 | Hocker et al. ............... | 715/837 |
| 5,852,440 A | * | 12/1998 | Grossman et al. ........... | 715/811 |
| 6,078,324 A | * | 6/2000 | Phathayakorn et al. ..... | 715/835 |
| 6,128,016 A | * | 10/2000 | Coelho et al. ............... | 715/808 |
| 6,167,533 A | * | 12/2000 | Potterveld et al. ........... | 714/25 |
| 6,392,667 B1 | * | 5/2002 | McKinnon et al. .......... | 715/738 |
| 6,900,822 B2 | * | 5/2005 | Germain et al. ............. | 715/736 |

* cited by examiner

*Primary Examiner*—David A. Wlley
*Assistant Examiner*—Le Nguyen
(74) *Attorney, Agent, or Firm*—Raymond M. Galasso; Galasso & Associates, LP

(57) ABSTRACT

One embodiment of the disclosures made herein is a data processing system adapted for enabling at least one of presence and operating condition of system components installed in the data processing system to be monitored. Examples of presence include installed and uninstalled. Examples of operating conditions include temperature, voltage, current, duty-cycle, etc. The data processing system includes provides a user interface adapted for displaying a 1:1 mapped representation of the data processing system. Operating conditions of installed system components may be assessed via the user interface. A system component that is installed in its respective location in the data processing system (e.g., in a particular socket) is depicted in the 1:1 mapped representation of the data processing system as being installed in a corresponding location of the data processing system. After performing an operation for installing a particular system component in its respective location of the data processing system (e.g., adding additional memory in an empty memory slot), the user interface is updated automatically to depict the particular system component as being installed in a corresponding location in the 1:1 mapped representation of the data processing system. A displayed system component representation of a failed or failing system component may be highlighted in the user interface for aiding in identifying the failed of failing system component.

9 Claims, 4 Drawing Sheets

METHOD AND EQUIPMENT ADAPTED FOR MONITORING SYSTEM COMPONENTS OF A DATA PROCESSING SYSTEM

CROSS REFERENCE TO RELATED APPLICATIONS

This application claims priority to co-pending U.S. Provisional Patent Application having Ser. No. 60/402,686 filed Aug. 12, 2002 entitled "Realistic Hardware Images For Presentation Of System Status", having a common applicant herewith.

FIELD OF THE DISCLOSURE

The present invention relates generally to data processing systems and, more particularly, to methods and equipment adapted for monitoring system components of data processing systems.

BACKGROUND

Information and the means to exchange information via computing technology have grown to be sophisticated and complex compared to the state of the art a mere 15 years ago. Today, computers have become critical to the efficient function and conduct of business in numerous sectors worldwide, ranging from governments to corporations and small businesses. The increasingly critical role of computing assets has, in turn, been the basis for concern from various sectors as to the reliability and manageability of computing assets.

System downtime events resulting from hardware problems result in considerable expense to businesses in the retail and securities industries, among others. Diagnosing and repairing a hardware-related problem within a system constitute a significant portion of the cost of system downtime. Furthermore, with networked applications taking on more essential business roles daily, the cost of system downtime will continue to grow.

Monitoring system components of a data processing system is known to aid in reducing downtime and, thus, costs associated with such downtime. Monitoring system components allows problems with components to be identified prior to a system component actually failing or to operation of the system component critically affecting performance of the data processing system. In conventional approaches for monitoring system components, it is known to present the user with a pictorial or simplified schematic view of the system for presenting status of temperature sensors, voltage sensors, fan speed sensors and the like. However, conventional approaches for monitoring system components have limitations associated with the manner in which information is presented.

One such limitation is that when presented with just the name of a failed or failing component (e.g., from a list of system components), it is often not obvious which specific system component is failed or failing upon opening the system's enclosure. Another such limitation is that it may still not be obvious which component is failed or failing in the case when a diagram (e.g., a schematic) is provided, but the diagram is not an accurate mapped representation of a respective portion of the actual data processing system. Still another such limitation is that inaccurate information is presented when a diagram used to depict a particular system is not automatically updated to recognize an added and/or removed system component.

Therefore, methods and equipment adapted for monitoring data processing system components in a manner that overcomes limitations associated with conventions approaches for monitoring data processing system components would be useful.

DETAILED DESCRIPTION OF THE FIGURES

Figure 1:
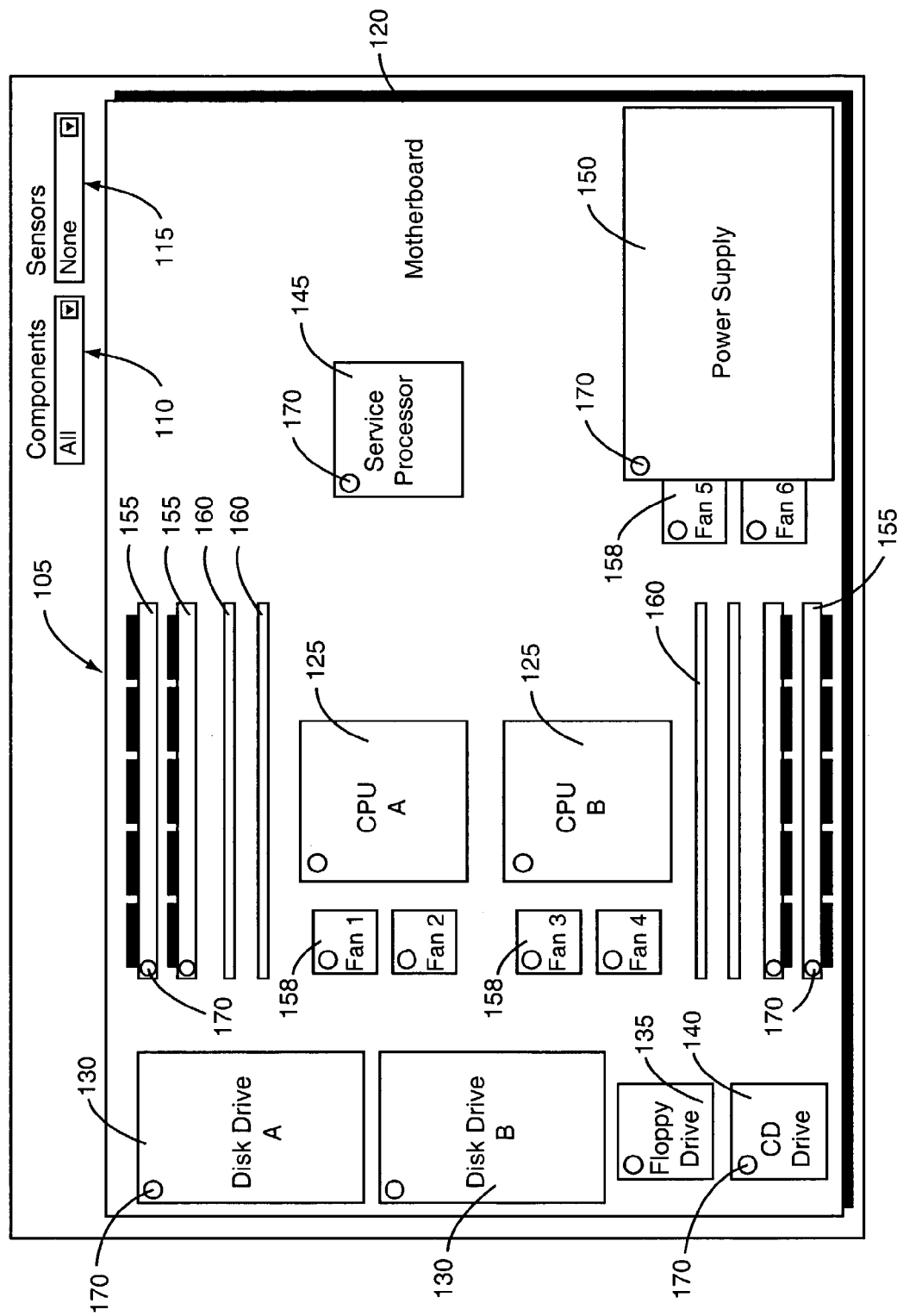
FIG. 1 depicts a user interface adapted for carrying out system component monitoring functionality in accordance with an embodiment of the disclosures made herein, wherein the user interface has a composite system component view of a data processing system displayed thereon.

Embodiments of the disclosures made herein pertain to methods and equipment adapted for monitoring system components of a data processing system. In accordance with such embodiments, a user is able to determine an operating status of monitored system components in a novel and advantageous manner. Examples of functionality provided by monitoring system components in accordance with embodiments of the disclosures made herein include simplifying correlation between system components represented in the user interface and actual system components, providing visual feedback as to whether optional system components are installed, and providing a simple approach for assessing detailed information associated with individual system components.

Monitoring system components in accordance with embodiments of the disclosures made herein of a data processing system contributes to reducing downtime of a data processing system and, thus, with reducing costs associated with such downtime. Monitoring system components in such a manner allows problems with system components to be identified prior to a system component actually failing or to operation of the system component critically affecting performance of the data processing system. Embodiments of the disclosures made herein support monitoring system components and identifying system components that have one or more out-of-spec operating conditions through in a manner that is advantageous relative to conventional approaches.

Identifying an actual failed or failing system component upon opening the data processing system enclosure is made easier through display of a mapped representation of the data processing system. In one embodiment of the disclosures made herein, the mapped representation is a 1:1 mapped representation. The 1:1 mapped means that system components are mapped with the intent of being accurately mapped in a 1:1 manner. However, issues such as display resolution, manufacturing tolerances, etc. will generally preclude 1:1 mapping in an absolute, precision sense.

In such a 1:1 mapped representation, spatial relationships (e.g., relating to location and/or size) of each displayed system component representation in the user interface are approximately the same as for the actual system component of the data processing system. Also in one embodiment of the disclosures made herein, the displayed system component representation of the failed or failing component is highlighted (e.g., by making it brighter, hiding other system component representations, drawing a border around it, showing in reverse contrast, showing in a particular color or some other technique) for aiding in locating the actual failed or failing system component, thus simplifying inspection and/or replacement of the failed or failing system component.

Displayed system components representations in a user interface in accordance with embodiments of the disclosures made herein are presented in a dynamic manner with respect to system components installed in the actual data processing system. Only system components that are actually installed in the system have a corresponding system component representation displayed in the user interface. Locations for optional system components (e.g., available memory slots) in the actual data processing system may be displayed in the user interface via a corresponding displayed system component representation (i.e., an uninstalled system component representation). Upon installing such an optional system components (e.g., a memory card), the user interface is automatically updated and a representation of the newly installed system component is displayed.

Operating information of system components may be visually assessed via a user interface in accordance with an embodiment of the disclosures made herein. For example, each system component represented in the user interface may have a visual indicator displayed therewith for designating when a critical operating condition (e.g., a upper limit operating temperature) has been achieved. A user may specify operating condition limits via the user interface.

Each system component represented in a user interface in accordance with an embodiment of the disclosures made herein may have one or more sensor icons displayed therewith. By selecting a particular sensor icon, actual operating condition information corresponding to the particular sensor is displayed. In at least one embodiment of the disclosures made herein, the operating condition information is presented real-time.

Turning now to specific figures, a user interface 100 adapted for carrying out system component monitoring functionality in accordance with an embodiment of the disclosures made herein is depicting in FIG. 1. The user interface 100 includes a system component view 105, a displayed system component designation field 110 and a displayed sensor designation field 115. The user interface 100 is displayed on a visual display of a data processing system (not specifically depicted). A monitor and a server are examples of the visual display and the data processing system, respectively. In at least one embodiment of the disclosures made herein, system component monitoring functionality is provided via a Graphical User Interface (GUI) subcomponent of a Service Processor's System Management component.

The system component view 105 includes representations of system components constituting a corresponding data processing system. Such representations of system components constituting a corresponding data processing system are referred to elsewhere herein as displayed system component representations. The displayed system component representations are mapped with respect to the corresponding data processing system. The term mapped refers to each displayed system component representation having at least a relative position approximately the same as the relative position of each actual system component in the data processing system. In one embodiment, the displayed system components are mapped with respect to relative size and relative position. It is contemplated and disclosed herein that such displayed system component representations may be in the form of photographic representations, illustrated representations, block diagram representations and/or another form of representation.

As depicted in FIG. 1, the system component view 105 includes a motherboard representation 120, a plurality of central processing units (CPU's) representations 125, a plurality of disk drive representations 130, a floppy drive representation 135, a compact disc (CD) drive representation 140, a service processor representation 145, a power supply representation 150, a plurality of memory module representations 155, a plurality of cooling fans 158 and a plurality of open memory module sockets 160. The plurality of central processing units (CPU's) representations 125, the plurality of disk drive representations 130, the floppy drive representation 135, the compact disc (CD) drive representation 140, the service processor representation 145, the power supply representation 150, the plurality of memory module representations 155 and the plurality of open memory module sockets 160 are depicted in spatial relationship to component mounting surface 165 of the motherboard representation 120. Each one of the CPU's 125 and the power supply 150 have at least one of the cooling fans 158 associated therewith.

The system components referred to in FIG. 1 are examples of system components in a data processing system. It is recognized that a representation of a data processing system in accordance with an embodiment of the disclosures made herein may include one or more other system components. Such one or more other system components may be of a type different than that disclosed herein. Furthermore, certain components that are conventionally affixed to a motherboard may be represented in the motherboard representation 120.

The motherboard representation 120, the plurality of central processing units (CPU's) representations 125, the plurality of disk drive representations 130, the floppy drive representation 135, the compact disc (CD) drive representation 140, the service processor representation 145, the power supply representation 150, the plurality of memory module representations 155, the plurality of cooling fans 158 and the plurality of open memory module sockets 160 are examples of displayed system component representations. At least a portion of the displayed system components has indicia associated therewith. The indicia are intended to aid in visually identifying a respective one of the displayed system component representations. Text (e.g., textual information depicted in FIG. 1), graphics (e.g., icons representing functionality or operation) and a combination thereof are examples of such indicia.

Each installed system component representation depicted in FIG. 1 (e.g., the plurality of disk drive representations 130, the floppy drive representation 135, the compact disc (CD) drive representation 140, the service processor representation 145, the power supply representation 150, the plurality of memory module representations 155) has an operating condition indicator 170 associated therewith. An example of a visual indicator capable of being displayed in different colors is the operating condition indicator 170. The operating condition indicator 170 is an example of an information display element. The operating condition indicator 170 is maintained in a first state (e.g., a first color, a first shape, a first indicia, etc.) when a corresponding installed system component is operating according to a first condition (e.g., a normal operating condition). The operating condition indicator 170 is maintained in a second state (e.g., a second color, a second shape, a second indicia, etc.) when a corresponding installed system component is operating according to a second condition (e.g., a critical operating condition).

In many data processing systems, certain system components are stacked (i.e., stacked system components) in a direction perpendicular to a mounting surface of a component mounting substrate (e.g., a motherboard). Accordingly, some system components are hidden below other system components in the data processing system. For example, two or more drives may be stacked such that at least one of the drives is hidden. Various approaches are contemplated herein for displaying stacked components in the system component view 105. In one embodiment (depicted in FIG. 1), a representation of a first stacked disk drive (e.g., disk drive A or floppy drive) is displayed adjacent to a representation of a second stacked disk drive (e.g., disk drive B or CD drive, respectively).

Figure 2A:
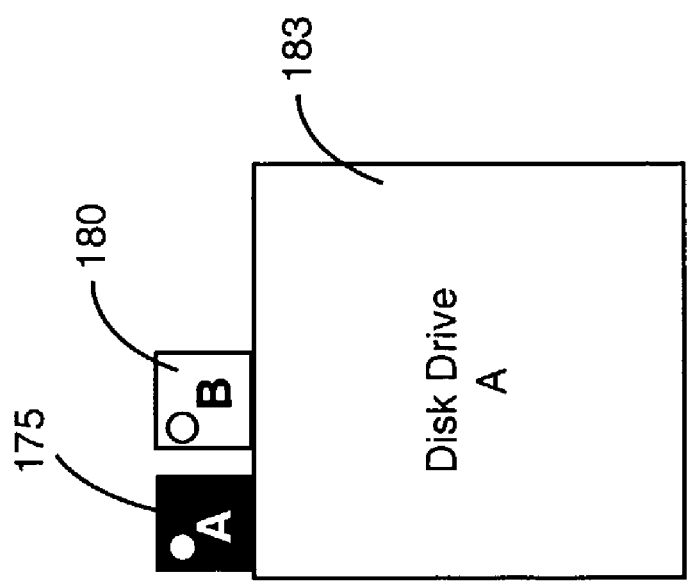
FIGS. 2A and 2B depict respective embodiments for representing stacked system components.
Figure 2B:
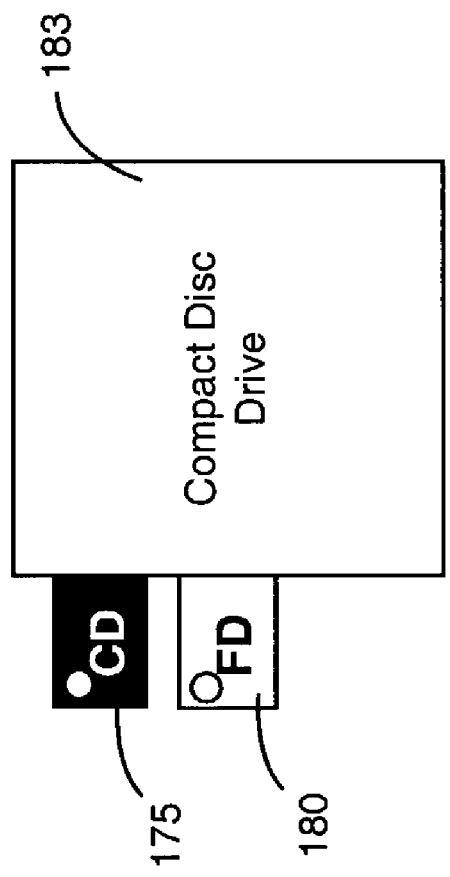

In another embodiment (depicted in FIGS. 2A and 2B), a first selectable tag 175 represents a first one of a plurality of stacked system component and a second selectable tag 180 represents a second one of the plurality of stacked system components. A stacked component representation 183 comprises a plurality of selectable tags (i.e., including the first selectable tag 175 and the second selectable tag 180). In response to selecting a particular one of the selectable tags (e.g., the first selectable tag 175), the stacked component representation 183 changes to depict a corresponding system component (e.g., depicting "Disk Drive A", "Compact Disc Drive", etc). It is contemplated herein that visual aspects of the stacked component representation 183 (e.g., indicia, shape, color, photographic image, illustration, etc) are dependent on which one of the plurality of selectable tags is selected. In such an embodiment, system component representations are displayed in a layered-orientation and information associated with each one of the system component representations is selectably displayable. Accordingly, system component representations in such an embodiment are displayable in a 1:1 mapped manner relative to system components of the actual data processing system, even though two or more components are disposed in stacked orientation.

Tags as referred to herein are examples of stacked system component selectors. It is contemplated herein that other embodiments of stacked system component selectors (e.g., discrete buttons) may be implemented in place of selectable tags. Selection of a particular stacked system component selector activates monitoring functionality (e.g., a temperature sensor) associated with the respective one of the plurality of stacked system components. Indicia (e.g., letters, acronyms, icons, etc) may be used for distinguishing each stacked system component selector. It is contemplated herein (as depicted in FIG. 2) that an operating condition indicator 170 may be associated with each stacked system component selector.

Figure 3:
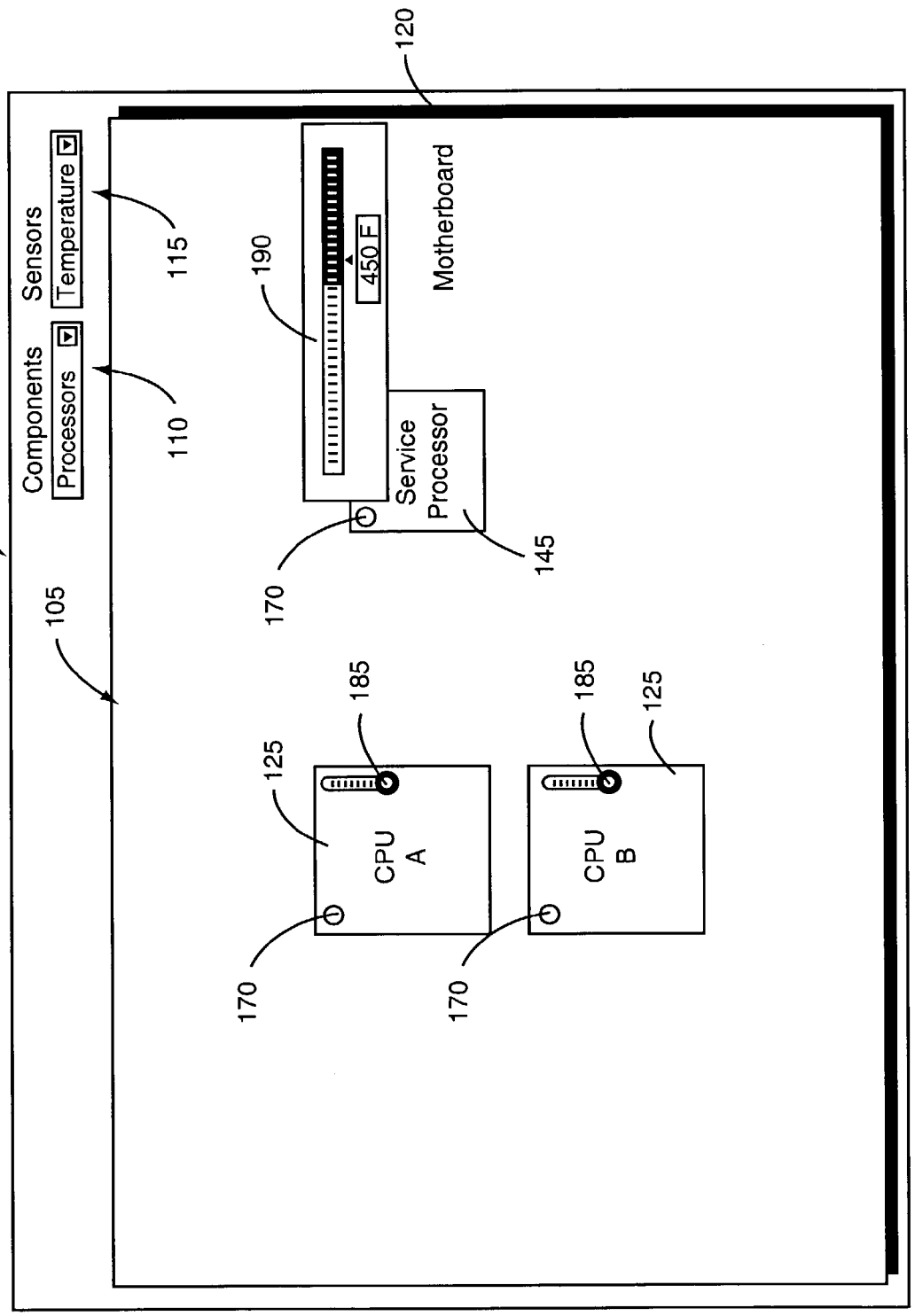
FIG. 3 depicts system component view of the data processing system, wherein only processor representations are displayed and wherein each processor representation is adapted for having temperature sensor information displayable therewith.

Referring to FIGS. 1 through 3, the displayed system component designation field 110 and the displayed sensor designation field 115 are adapted for allowing displayable system components and displayable sensors, respectively, to be selected for being displayed. In response to selecting a particular displayable system component selection (e.g., processors) and a particular displayable sensor selection, the system component view 105 is updated (as depicted in FIG. 3) for displaying only system component representations of the selected type and gauge representations corresponding sensors of the selected type. In response to selecting a gauge representation 185 (e.g., via hovering over a cursor the gauge representation or clicking the cursor on the gauge representation), a corresponding operating condition gauge 190 is displayed. The gauge representation 185 is an example of an information access selector and the information access selector is an example of an information display element.

Examples of displayable system component selections include, but are not limited to: All (i.e., all system components), Processors, CPU's, Service Processors, Fans, Drives (all types), Hard Disk Drives, CD's, Floppy Drives, Memory and Optional System Component Locations. Examples of displayable sensor selections include, but are not limited to: None (i.e., display no sensors), Temperature Sensors, Fan Speed Sensors, Duty-Cycle Sensors, Voltage Sensors and Current Sensors. It is contemplated herein that some system components have one of more sensors integrated therein from the manufacturer (e.g., a temperature sensor within a processor die), while other sensors are added-on to system components after their manufacture (e.g., adding a temperature sensor to a printed circuit board for monitoring a processor surface temperature).

Figure 4:
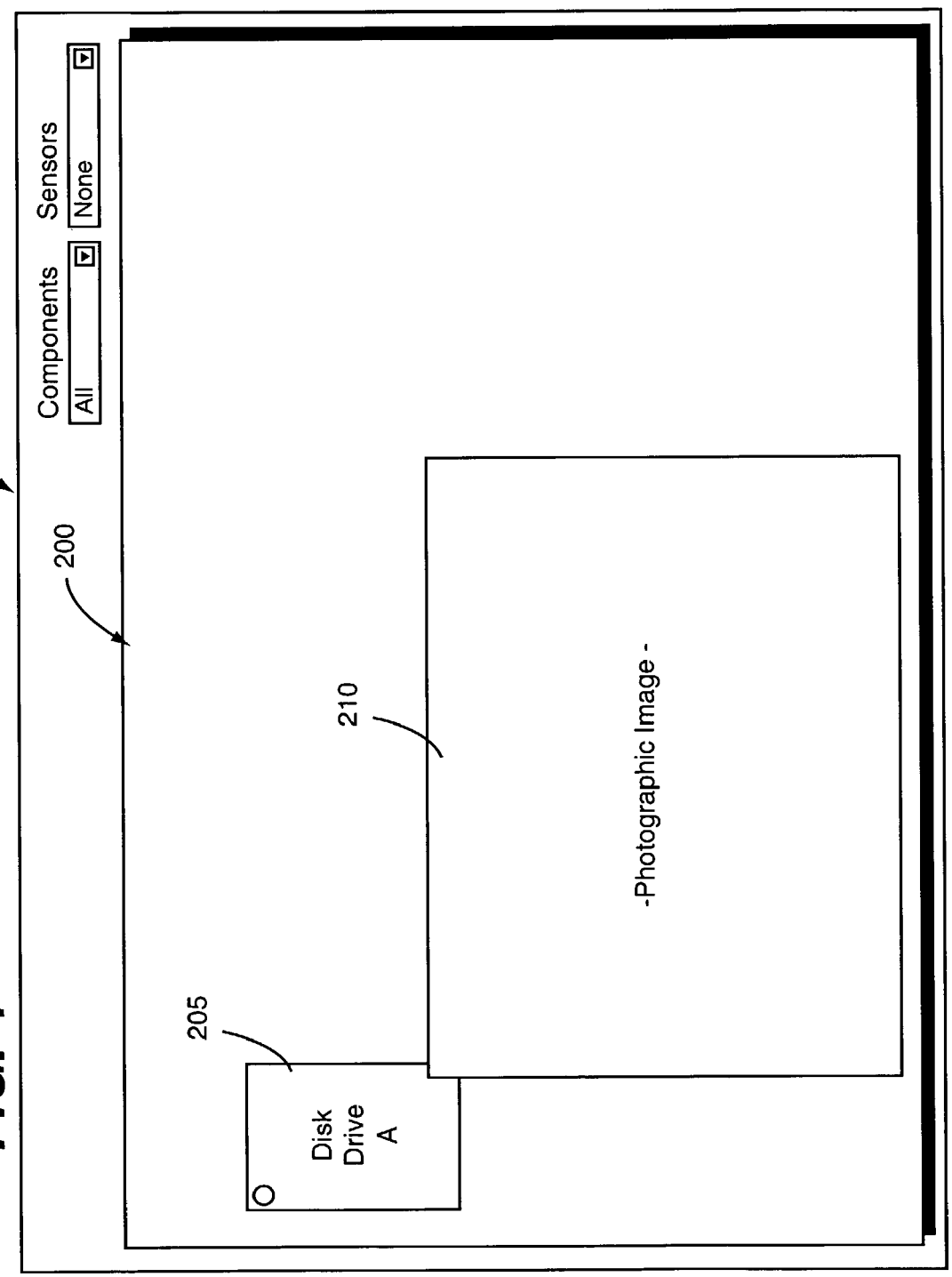
FIG. 4 depicts a component identification view of the user interface, wherein a photographic image of a suspect system component is displayed for aiding in identifying the suspect system component.

FIG. 4 depicts a component identification view 200 of the user interface 100. The component identification view facilitates visual identification of a suspect system component that needs to be inspected, replaced and/or repaired (e.g., via a system event view or via a portion of a diagnostic framework). To this end, a displayed system component representation 205 corresponding to the suspect system component is displayed in a highlighted manner by hiding all other system component representations. Highlighting the displayed system component representation 205 corresponding to a suspect system component (e.g., a system component that is failed or failing) aids in locating the suspect system component, thus simplifying inspection, replacement and/or repair of the suspect system component.

It is contemplated and disclosed herein that an operation may be performed for displaying a photographic image (e.g., a photographic image that is high-resolution, color or the like) or digital image of a suspect system component of a data processing system. For example, as depicted in FIG. 4, a photographic image 210 corresponding to a suspect system component may be selectively displayed (e.g., superimposed in front of at least a portion of displayed system component representations). One example of the operation for selectively displaying the high-resolution photographic image includes selecting an image view icon for causing the high-resolution photographic image to be displayed. Another example of the operation for selectively displaying the high-resolution photographic image includes positioning a cursor on the suspect system component, depressing a particular button of a mouse (e.g., a right-most button) wherein an image view menu selection is presented.

In at least one embodiment, the displayed system component representation 205 of the suspect system component is a non-photographic representation (e.g., an illustration) and the photographic image 210 is enlarged relative to the displayed system component representation 205. To further aid in identification of the suspect component, providing an image of the suspect component in relation to a reference/background system component is useful. For example, a high-resolution image of a processor as mounted on a corresponding motherboard may be displayed. One embodiment of facilitating such photographic image functionality includes associating each displayable system component representation with a corresponding photographic image (e.g., in a relational database).

In one embodiment of the disclosures made herein, the displayed system component representations are actual photographs of data processing system components (e.g., processors, memory, drives units, available component sockets, cooling fans, power supplies, etc) superimposed in their actual relative positions in front of a photographic background image of a printed circuit substrate associated with each of the data processing system components (e.g., a motherboard). It is contemplated herein that image-processing techniques (e.g., changing saturation, contrast, highlighting specific parts, etc) may be used to reduce a clutter appearance in the background image. Furthermore, it is contemplated that images of the components of interest may be enhanced (e.g., brightened, sharpened, colored, etc) to make them stand out from the background image. The combination of images (e.g., photographic picture, digital picture, illustrated image, etc) of data processing system components superimposed on an image of a background component (e.g., a motherboard) is referred to herein as a system component composite image. Accordingly, a first portion of the system component composite image is processed for reducing detail thereof and a second portion of the system component composite image is processed for enhancing detail thereof. Representations of non-component receiving elements (e.g., surface-mounted capacitors, resistors, diodes, etc) are examples of the first portion of the system component composite image. Representations of mountable system components (e.g., processors, drives, memory modules, etc) and of component mounting elements (e.g., sockets) are examples of the second portion of the system component composite image.

As mentioned above, the disclosures herein contemplate mapping displayable system component representations with actual system components of a data processing system. A technique for accomplishing such mapping includes generating displayable system component representations over a realistic image (e.g., photograph, 1:1 scaled schematic, etc) of the data processing system and then discarding or hiding the realistic image. Accordingly, relative location and relative size of displayed system component representations are mapped with respect to the corresponding locations in the actual data processing system. Relevant information for each displayable system component representation (e.g., relative size and relative location) may be maintained in a relational database and associated with relevant system component information.

An advantage of system component monitoring functionality as disclosed herein is that presence and operability of components may be assessed. Presence and operation of actual system components are synchronized with corresponding displayed system component representations in the user interface. For example, a CPU is assessed by a user via monitoring functionality disclosed herein and is found to have two memory DIMMs associated with it, even though a user knows that he installed four DIMMs. Monitoring in accordance with an embodiment of the disclosures made herein provides a visual indication that the memory installed by the user has some problem. Accordingly, the user knows that two of the DIMMS have been removed or are not active in the system. It is contemplated herein that a component may be recognized as being active in a data processing system even though it is not operating properly.

It is contemplated and disclosed herein that presence of system components may be facilitated via a BIOS of a data processing system of directly by a service processor of the data processing system. In the case where presence is facilitated via the BIOS, presence information is reported to the service processor by the BIOS. In the case where presence is facilitated directly by the service processor, a pin or contact of each system component may be used as controlling switch functionality for designating presence (e.g., switch open means system component not installed, switch closed means component installed).

Note also that although an embodiment of the present invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of displaying the user interface having a system component view, the system component view comprising:
   a system component composite image depicting a plurality of system components active in a data processing system;
   a plurality of information display elements, wherein at least a portion of said information display elements is superimposed on a respective one of said system components depicted in the system component composite image; and wherein
   a first portion of the system component composite image is processed for reducing detail thereof and a second portion of the system component composite image is processed for enhancing detail thereof; and wherein
   the first portion of the system component composite image for reducing detail includes a system component representation depicting static motherboard features and the second portion of the system component composite image for enhancing detail includes at least one of system component representations depicting system components mountable on the motherboard and system component representations depicting component mounting elements of the motherboard.

2. The system of claim 1 wherein each one of said information display elements is one of an information access selector and an operating condition indicator.

3. The system of claim 1 wherein a spatial relationship of system component representations of the system component composite image is 1:1 mapped with respect to a spatial relationship of said system components active in the data processing system.

4. The system of claim 3 wherein:
   the system component composite image includes a plurality of system component representation;
   one of said system component representations is a stacked system component representation including a plurality of stacked system component selectors; and
   information associated with a first one of said system components is displayed when a first one of said stacked system component selectors is selected and information associated with a second one of said system components is displayed when a second one of said stacked system component selectors is selected.

5. The system of claim 4 wherein each one of said stacked system component selectors has one of said information display elements associated therewith.

6. The system of claim 5 wherein each one of said information display elements is one of an information access selector and an operating condition indicator.

7. The system of claim 5 wherein the stacked system component representation includes selector-dependent indicia displayed therewith.

8. The system of claim 1, further comprising:
an operating condition gauge selectively superimposed on the system component composite image, wherein one of said information display elements is a gauge selector and the operating condition gauge is displayed in response to selecting the gauge selector.

9. The system of claim 8 wherein the operating condition gauge displays real-time operating conditions.

* * * * *